May 24, 1955  E. A. McLEAN  2,708,769
STUFFING SHIELD FOR ROASTING FOWLS
Filed Oct. 2, 1952
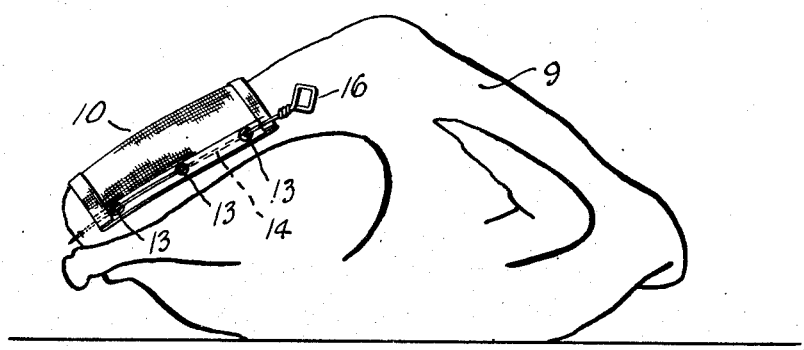
Fig. 1.
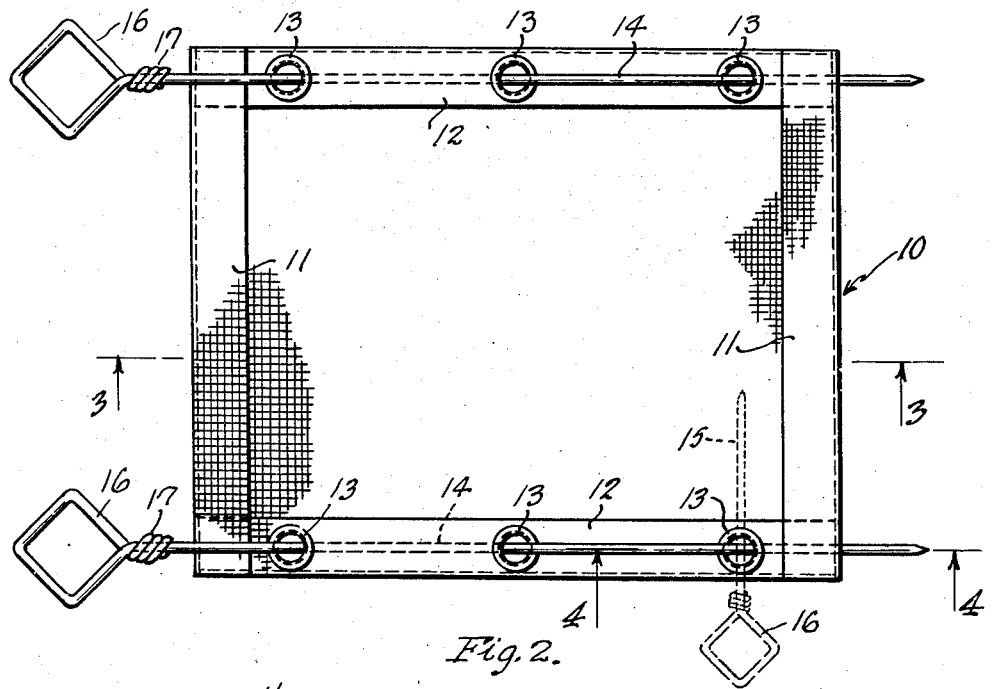
Fig. 2.
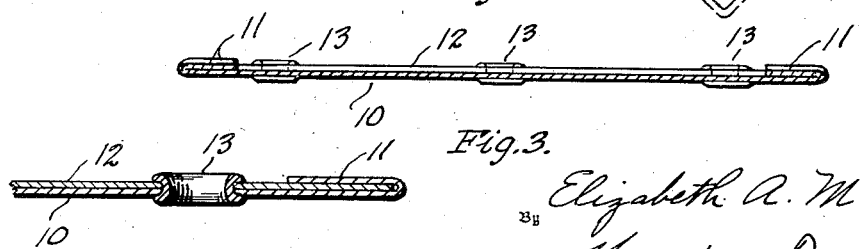
Fig. 3.
Fig. 4.
Inventor
Elizabeth A. McLean
By Wooster & Davis
Attorneys

United States Patent Office 2,708,769
Patented May 24, 1955

2,708,769

STUFFING SHIELD FOR ROASTING FOWLS

Elizabeth A. McLean, Stamford, Conn.

Application October 2, 1952, Serial No. 312,697

5 Claims. (Cl. 17—11)

This invention relates to stuffing shields for roasting fowls, and has for an object to provide a simple and effective shield to be placed over the opening in a stuffed fowl to retain the stuffing in the fowl during the roasting operation, but will permit portions of the stuffing to be exposed for browning during the roasting.

Another object is to provide such a device which will not draw the sides of the opening together, and will permit the use of a greater amount of stuffing.

A further object is to provide a device which will take much less time in preparing the fowl than will sewing with thread or string, and which, after the roasting operation, will be much easier and quicker to remove than threads or string.

Still another object is to provide a device which will permit steam and vapors to escape while cooking and permit browning of part of the stuffing.

A still further object is to provide a device which follows along as the meat shrinks in cooking and is less apt to tear the meat at the sides of the opening than would threads, string or similar closing means.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a side view of a fowl showing this device in place;

Fig. 2 is a top plan view of the device, and

Figs. 3 and 4 are detailed sections substantially on lines 3—3 and 4—4 respectively of Fig. 2, Fig. 4 being on an enlarged scale.

The object of this device is to cover the opening in a turkey, chicken, duck or other fowl through which the inwards have been removed, and which is used to stuff the fowl for roasting, to obviate the usual stitching and drawing together of the opposite sides of this opening after stuffing, with a thread or string, or lacing on skewers.

The device as shown comprises a substantially rectangular member 10 of wire mesh or screen, although if preferred it could be a flexible sheet of perforated metal or similar material. Wire mesh, however, has proved to be very satisfactory, as it is flexible so as to conform easily to the contour of the surface of the fowl to be covered, and it permits steam and vapors to escape during the cooking operation and also exposes parts of the stuffing to permit browning. The edges of the mesh or screen forming the body 10 are folded over as shown at 11 and 12 to strengthen and stiffen them and assist in retaining its shape, and also so that along the side edges as 12 can be inserted the eyelets or grommets 13. These eyelets hold the folded-over portions in position and also form means for threading through them the securing pins 14 and 15.

In use, the device is placed over the opening in the fowl 9 after the stuffing has been placed within this fowl, as shown over the rear opening in Fig. 1, although of course it will be understood a similar covering could be used over the crop opening at the front if desired. Due to the flexibility of the wire mesh or screen it can be readily bent or curved to conform to the contour of the surface of the skin about the opening, but it is not necessary to draw the sides of the opening together. If the long pins 14 are to be used, each is threaded through one of the eyelets 13 at one end of the device from the top thereof and under the skin of the fowl, as shown in dotted lines in Fig. 1, and up through the center eyelet, and then down through the other eyelet at the opposite ends of the device and under the skin at that end, there being used one of these long pins on each side of the device. If for any reason the long pin is objectionable or shorter pins are preferred, they may be used in a similar manner, or they could be used transversely, as shown at 15, Fig. 2, one pin for each eyelet inserted down through the eyelet and then under the skin adjacent this eyelet. Thus four or six of these pins would be used in the device shown.

As indicated on the drawing it is preferred that the heads 16 of the pins be square and connected to the body of the pin at one corner, as shown at 17, as this shape permits the insertion of a fork for easy withdrawal of the pin when hot after the roasting operation. After using, the device may be easily removed by merely withdrawing the pins, giving ready access to the stuffing.

Some of the advantages of this device over the old methods are: more stuffing can be placed in the fowl as the sides of the opening are not drawn together; it also takes much less time than sewing with thread or string, or lacing on skewers, in either attaching or removing, and is also much easier both to attach and remove than the usual stitching or lacing and therefore would be of material advantage in saving time for hotels and restaurants where large numbers of fowls are roasted. It permits steam and vapors to escape while cooking, and permits browning of part of the stuffing. It also follows along as the meat shrinks in cooking and is less apt to tear the meat at the sides of the opening.

Having thus set forth the nature of my invention, I claim:

1. A stuffing shield for roasting fowls comprising a a flexible foraminous metal sheet to place over the dressing opening in a fowl, a series of eyelets mounted in the sheet along opposite side edges thereof, and a series of pins comprising elongated body portions for inserting through the eyelets and under the skin of the fowl at the sides of the opening to retain the shield over said opening and retain the stuffing therein during the roasting operation.

2. A stuffing shield for roasting fowls comprising a body portion of flexible wire mesh screen to place over the dressing opening in a fowl, the edge portions of the screen being folded over to strengthen and stiffen the shield, a series of spaced eyelets mounted in the body and folded over portions along opposite side edges thereof and retaining the folded portions in position, and a series of pins comprising lengths of wire for inserting through the eyelets and under the skin of the fowl at the sides of the opening to retain the shield over said opening and retain the stuffing therein during the roasting operation.

3. A stuffing shield for roasting fowls comprising a flexible wire mesh screen to place over the dressing opening in a fowl, a series of spaced eyelets mounted in the screen along opposite side edges thereof, a series of pins comprising lengths of wire for inserting through the eyelets and under the skin of the fowl at the sides of the opening to retain the shield over said opening and retain the stuffing therein during the roasting operation, and the pins being provided with substantially square open heads for insertion of a fork or similar element to remove the pins from the fowl.

4. In a device of the character described, a dressed fowl having a dressing opening, a shield comprising a flexible foraminous metal sheet over and covering said opening and overlapping the flesh at opposite sides thereof, a series of spaced eyelets mounted in the sheet along opposite sides edges thereof, and means securing the sheet over the opening comprising a series of pins comprising body portions inserted through the eyelets and under the skin of the fowl at opposite sides of the opening retaining the shield over the opening and retaining the stuffing therein with part of it exposed during the roasting operation.

5. In a device of the character described, a dressed fowl having a dressing opening, a shield comprising a flexible wire mesh screen over and covering said opening and overlapping the flesh on opposite sides thereof, a series of spaced eyelets mounted in the screen along opposite side edges thereof, and a series of pins comprising lengths of wire inserted through the eyelets and under the skin of the fowl at opposite sides of the opening retaining the shield over the opening and retaining the stuffing therein during the roasting operation.

References Cited in the file of this patent
UNITED STATES PATENTS

| | | |
|---|---|---|
| 1,749,330 | Engh | Mar. 4, 1930 |
| 2,067,639 | Lett | Jan. 12, 1937 |
| 2,202,512 | Archer | May 28, 1940 |
| 2,331,600 | Dillow | Oct. 12, 1943 |
| 2,578,182 | Fricano | Dec. 11, 1951 |